United States Patent [19]

Jones et al.

[11] 4,346,511

[45] Aug. 31, 1982

[54] METHOD FOR PREPARING DOSIMETER FOR MEASURING SKIN DOSE

[75] Inventors: Donald E. Jones; DeRay Parker; Paul R. Boren, all of Idaho Falls, Id.

[73] Assignee: The United States of America as represented by the United States Department of Energy, Washington, D.C.

[21] Appl. No.: 165,452

[22] Filed: Jul. 2, 1980

Related U.S. Application Data

[62] Division of Ser. No. 55,211, Jul. 5, 1979, Pat. No. 4,286,165.

[51] Int. Cl.³ .................. B23P 3/00; B23P 25/00; B29B 3/00; B29F 1/10

[52] U.S. Cl. .................. 29/458; 29/460; 264/274; 264/277; 264/275; 264/279

[58] Field of Search .................. 29/460, 458; 250/484, 250/486; 264/271.1, 274, 275, 279, 277

[56] References Cited

U.S. PATENT DOCUMENTS

| | | | |
|---|---|---|---|
| 1,510,001 | 9/1924 | Gunning | 264/277 |
| 1,727,412 | 9/1929 | Roberts | 264/277 |
| 2,137,472 | 11/1938 | Forbes | 264/275 X |
| 2,263,953 | 11/1941 | Morcom | 264/275 X |
| 2,304,984 | 12/1942 | Wood | 264/275 X |
| 3,012,315 | 12/1961 | Stillwagon, Jr. | 264/277 X |
| 3,247,550 | 4/1966 | Haines, Jr. | 264/275 X |
| 3,439,917 | 4/1969 | Gentile | 264/275 X |
| 3,638,017 | 1/1972 | Jones et al. | 250/484 X |
| 3,971,841 | 7/1976 | Rubinstein | 264/275 |
| 4,117,069 | 9/1978 | Von Holdt | 264/271.1 X |

OTHER PUBLICATIONS

Gesell et al., "A Personnel Beta-Dosimetry Method for Reducing Energy Dependence," IDO-12090, Mar. 1979.

Charles, "The Development of a Practical 5 mg cm$^{-2}$ Skin Dosimeter," Proc. Fifth International Conf. on Luminescence Dosimetry, Sao Paulo, Brazil, Feb. 14-17, 1977.

Primary Examiner—Charlie T. Moon
Attorney, Agent, or Firm—Hugh W. Glenn; Frank H. Jackson; James E. Denny

[57] ABSTRACT

A personnel dosimeter includes a plurality of compartments containing thermoluminescent dosimeter phosphors for registering radiation dose absorbed in the wearer's sensitive skin layer and for registering more deeply penetrating radiation. Two of the phosphor compartments communicate with thin windows of different thicknesses to obtain a ratio of shallowly penetrating radiation, e.g. beta. A third phosphor is disposed within a compartment communicating with a window of substantially greater thickness than the windows of the first two compartments for estimating the more deeply penetrating radiation dose. By selecting certain phosphors that are insensitive to neutrons and by loading the holder material with neutron-absorbing elements, energetic neutron dose can be estimated separately from other radiation dose. This invention also involves a method of injection molding of dosimeter holders with thin windows of consistent thickness at the corresponding compartments of different holders. This is achieved through use of a die insert having the thin window of precision thickness in place prior to the injection molding step.

10 Claims, 8 Drawing Figures

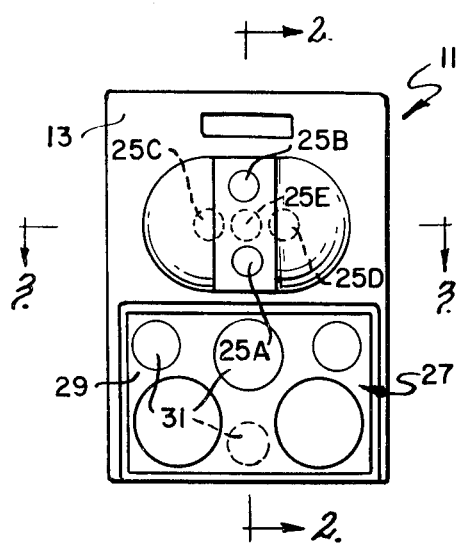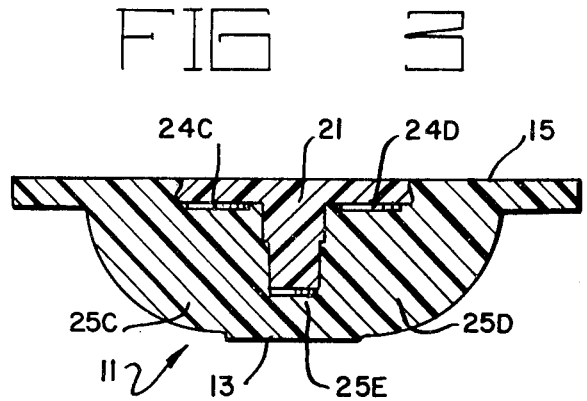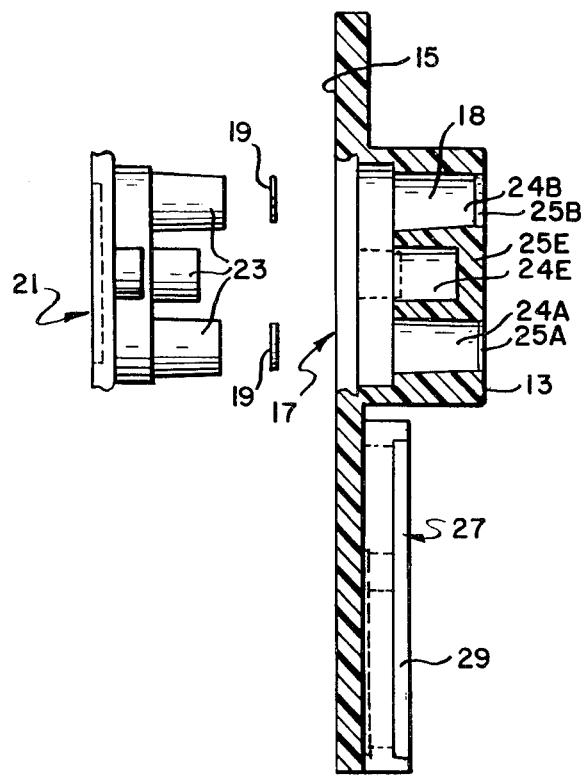

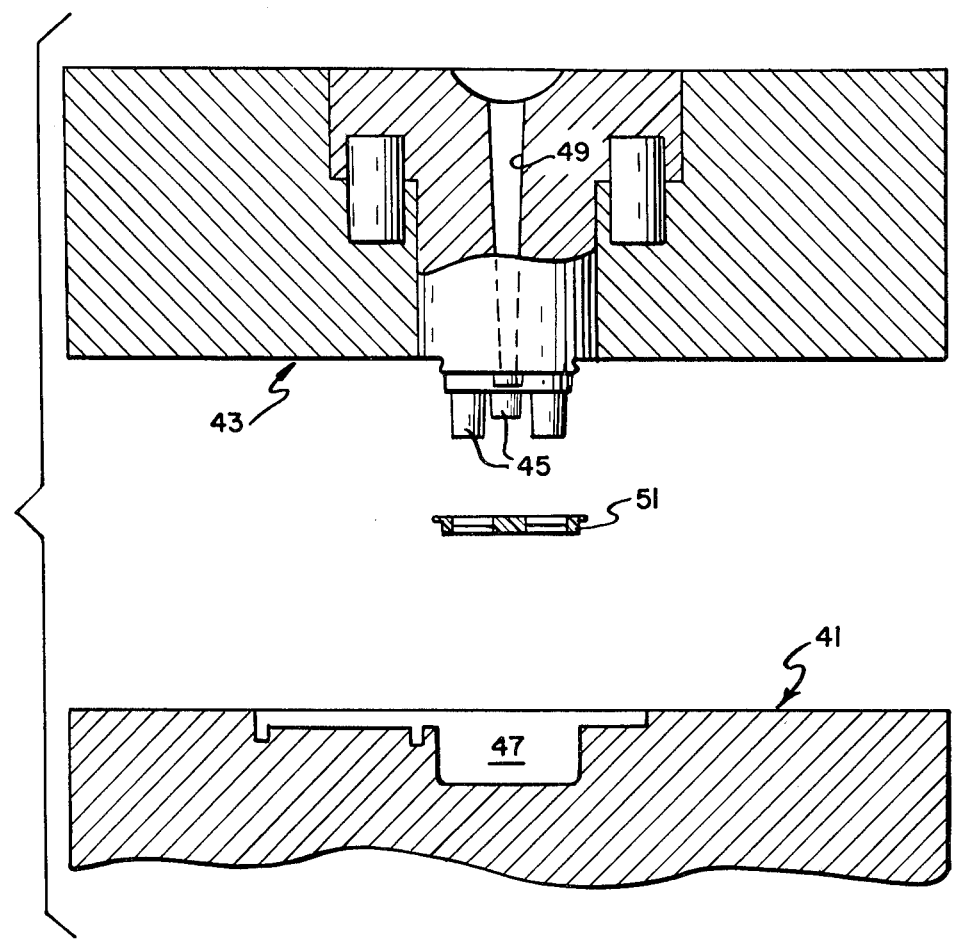
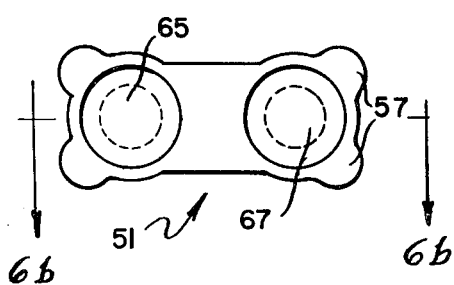
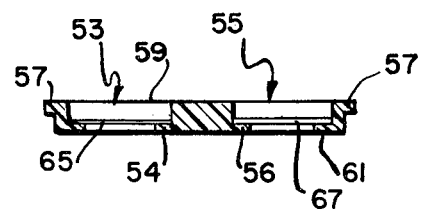

METHOD FOR PREPARING DOSIMETER FOR MEASURING SKIN DOSE

CONTRACTUAL ORIGIN OF THE INVENTION

The invention described herein was made in the course of, or under, a contract with the U.S. DEPARTMENT OF ENERGY.

This is a division of application Ser. No. 055,211, filed July 5, 1979, now U.S. Pat. No. 4,286,165 issued Aug. 25, 1981.

BACKGROUND OF THE INVENTION

The present invention relates to dosimeter badges for recording radiation dose to sensitive skin layers. It also comprehends the combination of such a dosimeter badge with one that will record dose from more penetrating radiation. Dose from beta radiation is of particular interest as it, except for very high-energy betas, is stopped in the outer surfaces of the individual. However, soft X-rays and gamma may also contribute to skin dose. In determining the radiation dose to an individual, all types of radiation including beta, gamma, X and neutron are of importance and are contemplated for measurement by the various embodiments of the present invention.

Recommended maximum dose for the skin has always been larger than for the whole body. The National Commission for Radiation Protection (NCRP 1971) recommends a maximum of 15 rem to the skin for any one year and a whole body maximum of 5 rem. Recently the International Commission for Radiation Protection (ICRP 1977) has recommended a more complex formula for proportioning doses among various organs but imposes an annual maximum of 50 rem to the skin and 5 rem to the whole body. Thus, when only penetrating or penetrating plus a small amount of low penetrating radiation are involved, precise dosimetry for the less energetic radiation is not particularly important. However, this is not the case for workers exposed to significant levels of beta radiation, for instance as might be produced by exposed mixed fission products or activation products resulting from the development of fission and fusion technology. The measurement of other low penetrating radiation such as soft X-rays is also of continuing importance for technicians using this useful tool in medicine and industry.

Prior efforts to measure low penetrating radiation and skin dose have reflected the lack of emphasis in this area. Beta-sensitive portions of dosimeters are often covered by windows of imprecise, inconsistent or even unknown thickness. Dosimetry estimates are routinely made with window thicknesses in excess of 10 mg/cm$^2$ to about 100 mg/cm$^2$ density thickness which are capable of excluding a substantial portion of low-energy betas.

One dosimeter that is currently in use at the Idaho National Engineering Laboratory provides a considerable improvement in distinguishing between penetrating and nonpenetrating radiation. This dosimeter employs a first thermoluminescent dosimeter (TLD) phosphor behind a window of about 4-5 mg/cm$^2$ density thickness and a second phosphor under about 540 mg/cm$^2$ of aluminum. Through appropriate calibrations the net readings of the two phosphors correspond somewhat to the nonpenetrating radiation dose. However, one serious shortcoming of this system is that the low penetrating readings are very energy-dependent as a result of relatively high phosphor thicknesses (e.g. 240 mg/cm$^2$) under each of the windows. This can only be overcome if the dosimeter is calibrated at the same energy levels and in the same type radiation fields to which the wearer is exposed.

The International Commission on Radiation Protection (ICRP) in 1977 selected the range of 5-10 mg/cm$^2$ as an appropriate skin layer for the determination of absorbed skin dose. Other investigators in this technology have recommended broader and deeper ranges for the consideration of skin dose such that dosimeter designs and methods should accommodate effective dosimetry within this selected range as well as other ranges that subsequently may become of interest.

One suggested dosimeter for measuring radiation dose to the ICRP recommended skin layer employs two thermoluminescent phosphors, one under a 5 mg/cm$^2$ window and one under a 10 mg/cm$^2$ window. Unless extremely thin thermoluminescent phosphors become available, the readings made by a dosimeter of this type not only will be energy-dependent but also will be greatly affected by ordinary variations among the different chips. Phosphor chips of about 200-300 mg/cm$^2$ thickness are ordinarily used. Chips of 100 mg/cm$^2$ are available but are extremely frangible and result in a very high breakage rate. It is quite apparent that only 5% fluctuation in readings among the various chips may well result in a substantially higher difference in reading than that attributable to the differences in window density thickness. Consequently, this direct approach to dosimetry within a defined but relatively thin layer can be expected to give only a rough indication of dose.

PRIOR ART STATEMENT

The following publications relate to but do not disclose or teach the dosimeter or method of the present invention.

Charles, "The Development of a Practical 5 mg/cm$^2$ Skin Dosimeter," *Proceedings of the Fifth International Conference on Luminescent Dosimetry*, Sao Paulo, Brazil, pages 313-323 (1977). This paper suggests a personnel dosimeter design for implementing the ICRP recommendation of measuring skin dose within a 5-10 mg/cm$^2$ layer. Among the possible designs presented, one included a first thermoluminescent dosimeter phosphor behind a 5 mg/cm$^2$ window and a second TLD phosphor behind a 10 mg/cm$^2$ window such that dose measurements can be obtained from a calibration relating to the difference between the readings of these two phosphors. The paper does not teach the use of more than two phosphor windows in combination or the use of window thicknesses other than those corresponding to skin layer thickness for this purpose.

Hoy, U.S. Pat. No. 3,699,337, Oct. 17, 1972. This patent teaches the use of two pairs of thermoluminescent lithium fluoride phosphors, each pair being placed at different levels within a hemisphere of neutron-moderating material. Each phosphor pair includes one phosphor with only Li$^7$ and a second phosphor including Li$^6$ for separating neutron from other radiation dose. The phosphors are disposed at different levels of moderating material to obtain some estimate of neutron energy spectrum. Thermal neutrons are screened by a covering of cadmium metal.

Jones, U.S. Pat. No. 3,638,017, Jan. 25, 1972. This patent describes a method of injection molding of personnel neutron dosimeter holders.

Brady, U.S. Pat. No. 3,393,318, July 16, 1968. This patent presents a combination film badge and credential holder including various dosimetric elements such as film for different types of radiation and a glass fluorod or thermoluminescent rod, etc. for criticality dosimetry.

None of the publications listed disclose or suggest the novel combination of more than two thermoluminescent phosphor compartments under windows of predetermined and substantially different thicknesses for determining dose to a defined skin layer while taking into account energy dependence and fluctuation resulting from the use of relatively thick thermoluminescent phosphors. Also, these publications fail to disclose applicants' method of providing injection molded dosimeter holders with thin windows of consistent thickness at corresponding positions within various holders.

SUMMARY OF THE INVENTION

Therefore, it is an object of the present invention to provide an improved personnel dosimeter for measuring dose to the skin of the wearer.

It is a further object to provide a dosimeter for both low-penetrating radiation dose to the skin and penetrating radiation to the body of the wearer.

It is a further object to provide a method of fabricating a personnel dosimeter holder with windows of uniform thickness at corresponding locations among the various dosimeter holders produced.

In accordance with the present invention, a personnel dosimeter is provided for measuring radiation to a defined skin layer between density thickness limits. The personnel dosimeter includes a holder of thermoplastic material having a front face and a rear wall with an opening for access to a plurality of dosimeter wells. A plug is adapted to seat within the rear wall opening and includes a plurality of posts each of which corresponds to one of the plurality of wells so as to define a plurality of compartments for containing TLD phosphors. The front face of the holder has a first window communicating with a first compartment. This first window has a thickness of at least about that of the lesser limit of the skin layer but no more than the deeper skin layer limit in which the radiation dose is to be determined. A second window within the front face at a second compartment has a density thickness substantially greater than that of the first window and that of the deeper limit of the skin layer of interest. This second window density thickness is greater than that of the first window by at least 5% but no more than 100% of the average density thickness of the phosphors employed within the first and second compartments. A third window within the front face at a third compartment includes a density thickness of more than that of the second window and that of the average density thickness of the phosphors within the first and second compartments to permit an estimation of penetrating radiation dose. This permits determination of the ratio of net dose absorbed within the TLD phosphors behind the first and second windows. Radiation dose to the defined skin layer can be determined as a function of this ratio of net radiation dose.

In more specific aspects, an additional window and compartment is included for containing a phosphor sensitive to neutrons as well as beta, gamma and X-radiation, while the phosphors within the first, second and third compartments are sensitive to only beta, gamma and X-radiation. This arrangement allows neutron radiation to be separately determined. In one other aspect, a neutron-absorbing material such as BN, B$_4$C, LiF, Li$_2$BO$_4$ is filled within the thermoplastic material of the dosimeter holder body for removing the contribution of thermal neutrons from the dose registered by phosphors.

Also, in accordance with the present invention, a method of forming a dosimeter holder is provided. The holder includes a plurality of windows communicating with a plurality of corresponding compartments for TLD phosphors near the front face of the holder. Uniform window thicknesses among corresponding windows of different holders are of importance. The method comprises forming a die insert containing at least one window of the desired thickness. The die insert and window are positioned within a die shaped for injection molding of the dosimeter holder and thermoplastic material is injected into the die around the insert such that the dosimeter holder is formed with the window in place. Windows of precise and uniform thickness can be cut from sheets of previously fabricated material for use in the die insert.

DETAILED DESCRIPTION OF THE DRAWINGS

The present invention is illustrated in the accompanying drawings wherein:

FIG. 1 is a front view of a personnel dosimeter;

FIG. 2 is an enlarged cross-sectional and exploded view of the dosimeter of FIG. 1;

FIG. 3 is another cross-sectional view at the indicated location in FIG. 1;

FIG. 6 is an exploded view of a die and die insert for injection molding of a dosimeter holder;

FIG. 6a is an enlarged view of the die insert in FIG. 6; and

FIG. 6b is a side view of FIG. 6a in cross section.

DETAILED DESCRIPTION OF THE PREFERRED EMBODIMENT

Figure 4:
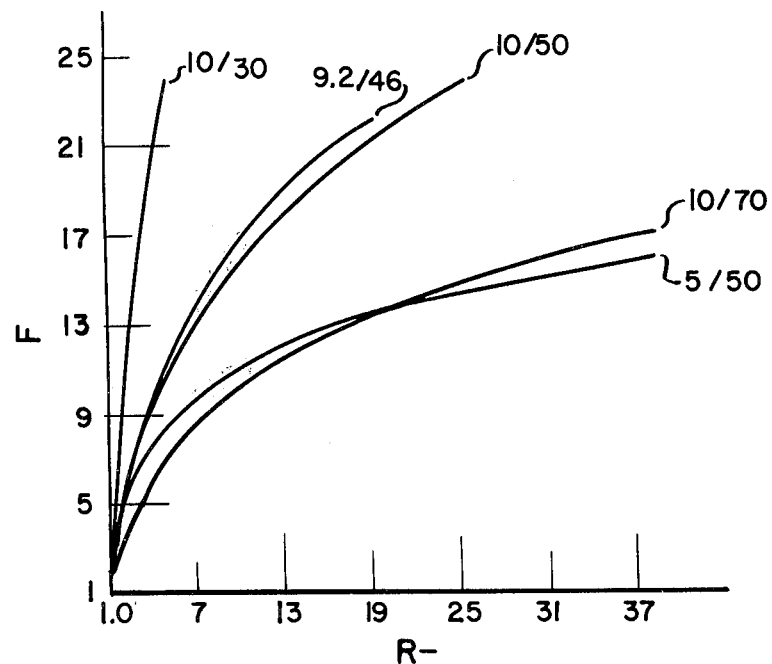
FIG. 4 is a graph of the geometric function F versus the ratio of TLD phosphor readings behind first and second windows of predetermined thickness for different sets of window thicknesses.

In FIGS. 1, 2 and 3, a personnel dosimeter is presented. A holder 11 of injection molded thermoplastic material includes a front face 13 and a rear wall 15. The rear wall is provided with an opening 17 communicating into a plurality of wells 18 for holding TLD phosphors 19. The opening 17 is adapted to receive a removable rear plug 21 having a plurality of posts 23, each of which corresponds to a well 18 for defining compartments, for example at 24A, 24B, 24C, 24D and 24E, for the TLD phosphors. Plug 21 may be removed by appropriate prying action.

The front face 13 of the holder includes a lower portion 27 that can include a space for holding credentials 29 and wells 31 for containing various conventional types of radiation detectors such as film and criticality dosimeters.

The windows illustrated at 25A, 25B, 25C, 25D and 25E within the front face of the dosimeter holder are of different predetermined thicknesses to provide useful information for determining radiation dose to a defined skin layer. The information is also useful for determining the dose of more penetrating radiation. The thinnest window illustrated at 25A is preferably of about the same density thickness as that of the lesser limit to the skin layer to be examined. The IRCP lesser limit recommendation of 5 mg/cm² roughly corresponds to the thickness of the epidermis which is thought to be relatively nonradiosensitive. Over much of the body the epidermis is about 4 to 8 mg/cm² density thickness, although thicknesses of as much as 40 mg/cm² may be found on the palms of the hands and soles of the feet. Thus a lesser limit of about 5 mg/cm² corresponds to about the epidermal skin layer over most of the wearer's body.

Windows of about 5 mg/cm² density thickness of plastic material are so thin (e.g. about 50 μm) that they are difficult to produce with uniformity and are quite susceptible to damage. Therefore, windows of up to twice this lesser limit are contemplated, but of no more than the greater limit of the skin layer to be examined. By selecting these limits for the first window thickness, radiation is transmitted to the phosphor 19 within the first compartment 24A that is within the range absorbed within the skin layer of interest. As an example, window 25A for use in a dosimeter for measuring radiation dose to the ICRP recommended layer of 5–10 mg/cm² can have a thickness of about 4–10 mg/cm².

The thickness of the second window 25B is selected so that it is sufficient to attenuate beta and other soft radiation to a level that is substantially less than the radiation energy passing through the first window 25A. The required difference in attenuation is determined so as to be significant relative to the ordinary expected fluctuations in radiation dose registered by phosphors selected for use in the corresponding compartments 24A and 24B. Since the phosphor registers the dose that it absorbs within its own density thickness, window 25B will have no greater density thickness than that of the average phosphor above that of window 25A.

Typically, in a personnel dosimeter of this type, lithium fluoride phosphors of about 200–300 mg/cm² are employed. More frangible phosphors as thin as about 100 mg/cm² also can be selected. About one-third of the typical and more durable phosphors are found to give readings that are 5% or more above the average reading when exposed to a known and constant radiation level. Therefore a second window 25B having a thickness that is substantially greater than that of the first window 25A to produce a significant difference in attenuation of beta and other soft radiation as compared to that resulting from phosphor deviations will have a density thickness greater than that of the first window by at least 5% of the average phosphor density thickness. For greater differences in attenuation attributable to phosphor deviation, the density difference of the second window should correspondingly be increased. As an example, the second window thickness in a personnel dosimeter employing lithium fluoride phosphors of about 240 mg/cm² thickness would be in a range of about 20–250 mg/cm² and preferably within a range of about 30–100 mg/cm² in order to measure skin dose to a 5–10 mg/cm² layer.

The third window 25C is sufficiently thick to permit estimation of the penetrating radiation that passes through the skin into the body of the wearer. This reading can be deducted from the readings of phosphors within the first and second compartments 24A and 24B to obtain net phosphor readings for a subsequent dose determination to the defined skin layer. By using a window at least as thick as the second window plus the average phosphor density thickness, the dose reading from the phosphor behind the third window, in general, will represent more penetrating radiation than that registered by the phosphors in compartments 24A and 24B. For phosphors in the 200–300 mg/cm² range, window 25C will typically be in a range of 500–1000 mg/cm². In addition, the IRCP recommends that penetrating radiation dose be measured at 1 cm depth (about 1000 mg/cm²) of a wearer. By placing the phosphor in compartment 24C at that depth it can serve the dual purpose of registering penetrating radiation into the wearer as well as registering the penetrating radiation dose that can be deducted from the readings used to determine dose to the defined skin layer.

An additional compartment 24D disposed behind window 25D is illustrated for use in dosimeters that are expected to be exposed to neutron in addition to beta, gamma and X-radiation. A phosphor that is sensitive to each of these types of radiation such as $Li^6F$ is selected for use in this compartment. Window 25D is of essentially the same thickness as window 25C. By using phosphors within the first three compartments 24A, 24B and 24C that are only sensitive to beta, gamma and X-radiation, e.g. $Li^7F$ or $CaF_2$, the dose contribution attributable to neutron radiation can be determined separately from that of gamma, beta and X-radiation.

One other refinement in accurately determining neutron radiation dose can be made by removing thermal neutrons from the spectrum reaching the neutron-sensitive phosphor. This is advantageously accomplished by filling the thermoplastic material prior to injection molding of the holder with a thermal-neutron-absorbing material. By using materials containing only elements of low atomic number, i.e. less than about 10, disproportional attenuation of gamma, X and beta radiation can be minimized. For this reason, metal coatings and fillers of materials such as cadmium are avoided and materials including BN, $B_4C$, LiF, $Li_2BO_4$ are selected as a filler.

One additional compartment 24E for a dosimeter phosphor is also illustrated. One example of how this compartment may be used involves including a window 25E in front of the phosphor of about the same density thickness as the lens of the wearer's eye (e.g. about 300–400 mg/cm²) and thereby provide dose readings relevant to the radiation dose to that organ. Of course, windows and compartments of other thicknesses and functions can also be selected for use.

Holder 11 is made of a thermoplastic material that can be conveniently injection molded into the desired configuration. The material is one that will suitably simulate the skin and flesh of the wearer for purposes of radiation attenuation. Materials such as polypropylene, acrylonitrile-butadiene-styrene and polycarbonates, i.e. polyesters of carbonic acid such as those formed from bisphenol A and diphenyl carbonate or bisphenol A and phosgene, are contemplated. The very thin windows, e.g. 25A, 25B, can be made of a plastic such as polyethylene terephthalate (available under the trade name Mylar) or from a polycarbonate. Where a transparent material such as Mylar is selected, it is advantageously aluminized on at least one surface to make it opaque to light. The material selected for these windows is sufficiently strong and tough to resist tearing in thin sheet form and is thermally stable to permit preannealing of the phosphors within the holder at temperatures of e.g. 80°–100° C.

The radiation dose from low-penetrating radiation exposure to the defined skin layer can be determined from procedures fully described in IDO-12090, "A Personnel Beta-Dosimetry Method for Reducing Energy Dependence," Gesell et al., U.S. Department of Energy, 1979. For this purpose, this report is expressly incorporated by reference. The beta dose to the defined skin layer may be obtained by first subtracting the deep phosphor reading (within compartment 24C) from each of the readings of phosphors within the shallow compartments 24A and 24B. The ratio of these two net readings then may be employed to determine the effective mass attenuation coefficient in accordance with the following equation:

$$k = \frac{1}{(t_2 - t_1)} \ln(C_1/C_2) \quad \text{Eq. 1}$$

where
  $k$ = the effective mass attenuation coefficient
  $t_1$ = density thickness of the window 25A
  $t_2$ = density thickness of the window 25B
  $C_1$ = net reading of the phosphor in compartment 24A
  $C_2$ = net reading of the phosphor in compartment 24B.

The effective mass attenuation constant, $k$, is the constant used to express dose as a function of density thickness as follows:

$$D(x) = D_o e^{-kx} \quad \text{Eq. 2}$$

For situations in which the distance from the source is nearly invariant, the dose $D(x)$ at density thickness $x$ is given in terms of the surface dose $D_o$ which may be assumed to be unity at the surface.

Once $k$ is determined, a geometric factor F is calculated. This factor relates the dose within the defined skin layer to the measured dose deposited within the density thickness of the phosphor within compartment 24A behind the thin window. F may be obtained from the following equation:

$$F = \frac{\frac{1}{k(a-b)}[e^{-kb} - e^{-ka}]}{\frac{1}{kT}[e^{-t_1 k} - e^{-(t_1+T)k}]} \quad \text{Eq. 3}$$

where T is the phosphor thickness, a is the lesser and b the greater limit of skin layer density thickness. Once F is obtained, the dose to the defined skin layer may be determined as the product of F, the net reading at the phosphor within compartment 24A and a gamma calibration factor. The gamma calibration factor is an empirically determined proportionality factor relating gamma dose to phosphor reading.

FIG. 4 is a graph of the calculated geometric function F versus the ratio R of net phosphor readings from compartments 24A and 24B with various window thickness combinations as parameters. The graph illustrates examples of suitable combinations of window thicknesses for use in estimating skin dose between the ICRP recommended limits of 5 mg/cm$^2$ and 10 mg/cm$^2$.

Figure 5:
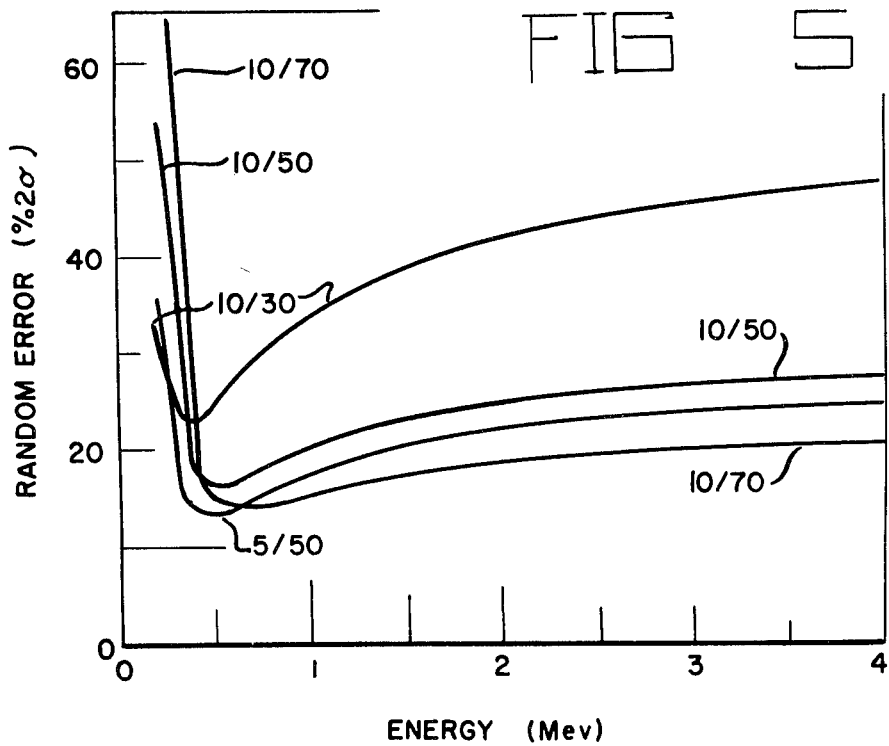
FIG. 5 is a graph of random error versus energy of radiation for various sets of window thicknesses.

FIG. 5 shows the calculated random error of the present dosimeter design as a function of beta energy for several combinations of window thicknesses within compartments 24A and 24B. The combination of $t_1$ = 10 and $t_2$ = 30 is good at low energies but poor at higher energies. The combination $t_1$ = 10 and $t_2$ = 70 is very poor at low energies but of good accuracy at high energies. The combination $t_1$ = 10 and $t_2$ = 50 is a reasonable compromise between the high and low energy extremes. The use of thinner values for $t_1$ (window 25A) improves the situation considerably as illustrated by the curve $t_1$ = 5 and $t_2$ = 50. Therefore it is seen that the window in front of compartment 24A should be of about the same density thickness as the lesser limit of the skin layer to be evaluated. However, since windows of 5 mg/cm$^2$ (approximately 50 microns of polyethylene terephthalate) are so thin as to possibly be fragile, a thickness of 10 mg/cm$^2$ may be more appropriate and realistic.

It is also seen from FIG. 5 that to obtain reasonable accuracies at least at beta energies of 0.5 Mev and above the second window (25B) must be substantially thicker than the first window (25A). In estimating dose within a skin layer of 5–10 mg/cm$^2$, it is seen that first and second window thicknesses that are closer than 10 and 30 mg/cm$^2$ will provide large errors at these higher energies. Assuming that dosimeter phosphors in the range of 200–300 mg/cm$^2$ are sufficiently thick to register substantial portions of the radiation passing the filters, it is seen from FIG. 5 that the second window thickness should exceed the thickness of the first window by at least 5% of the phosphor thickness. The window combinations of 5/50, 10/50 and 10/70 illustrated in FIG. 5 appear to exhibit the potential for fair estimation of radiation dose to skin layers for beta energies of 0.5 Mev and above.

One other aspect of the present invention is a method of providing thin windows of consistent thickness at corresponding locations in large numbers of dosimeter holders. In preparing such holders, well-known injection molding techniques are employed using thermoplastic materials such as polypropylene acrylonitrile-butadiene-styrene or a polycarbonate resin.

In FIG. 6, a pair of matching die plates are shown with the lower plate 41 corresponding to the badge front and the upper plate 43 corresponding to the badge rear. The lower plate 41 includes a cavity 47 of the dosimeter holder shape adapted to sealingly receive the upper plate. The upper plate 43 includes pins 45 corresponding to the wells and compartments for holding the thermoluminescent phosphors. A suitable connection and passageway 49 is illustrated for injecting the heated thermoplastic material under pressure.

Applicants' novel method for forming holders with thin windows of uniform thickness is carried out by first forming a die insert 51 for positioning within the lower die cavity 47. FIGS. 6a and 6b illustrate an enlarged die insert 51 as a thin plate with openings 53 and 55 through its thickness. Positioning tabs 57 are molded at each corner of the insert 51 for accurate location within cavity 47. Tabs 57 are illustrated as rounded extensions of reduced thickness at each corner of the die insert. The tabs are located at the rear face 59 of the insert away from the insert front face 61 which corresponds to the front face of the badge. This permits the injection of thermoplastic material around the insert and tabs to form an integral dosimeter holder.

Two circular openings 53 and 55 extend through the insert thickness and include molded ring portions 54 and 56 at front face 61. These ring portions provide support for layer sections 65 and 67 of thin plastic material. Various other structural variations such as small protrusions around an internal circumference of the tapering of openings 53, 55 may also be used to support these layer sections.

Layer sections 65 and 67 ultimately become the thin windows 25A and 25B within the front of the dosimeter holder. These layer sections are advantageously provided of a tough and thermally stable plastic material such as polyethylene terephthalate to permit very thin layers having a density thickness of as little as 5 to 10 mg/cm$^2$. Thermoplastic materials such as a polycarbonate resin formed from bisphenol A and diphenyl carbonate or phosgene may be used where phosphor annealing temperatures (e.g. 80°–100° C.) are anticipated to be below the heat distortion temperature of the polycarbonate resin.

Where window 25B is to be of sufficient thickness, e.g. 50 mg/cm$^2$ or more, to permit it to be formed in the injection molding of the holder, a modified die insert (not shown) can be used to hold only a single layer section corresponding to window 25A.

Layer sections 65 and 67 are of about the same diameter as openings 53 and 55 but both openings 53, 55 and layer sections 65, 67 are somewhat larger than the diameter of pins 45 within the upper die 43. This permits the flow of thermoplastic material around the die pins 45 into contact with the layer sections 65 and 67 to firmly mold these sections in place as windows 25A and 25B.

In the method of injection molding of the dosimeter holder, die insert 51 is loaded with layer sections 65 and 67 from the rear surface 59 such that they are suitably supported on ring portions 54, 56 or on protrusions on the internal surfaces of openings 53, 55. The die insert 51 is placed face down within the lower die cavity 47 and the upper die plate 43 assembled with pins 45 centered within openings 53 and 55 to push layer sections 65 and 67 to the front face. Positioning tabs 57 exactly locate the die insert within the lower die for receiving pins 45. Thermoplastic material is injected through connection 49 of the upper die plate 43 into the remaining voids of cavity 47 within the die. Die insert 51 and layer sections 65 and 67 are thus molded as integral parts within the dosimeter holder. The upper die with pins 45 is removed to leave wells 18 formed in the holder. The rear plug 21 for the dosimeter holder is separately molded in an appropriate die.

It has been found that layer sections 65 and 67 become firmly molded into the dosimeter holder front face as windows 25A and 25B. Through use of this technique windows of consistent thickness can be provided at the corresponding locations within a series of dosimeters produced by this method.

It will therefore be seen that an improved personnel dosimeter is provided that permits measurement of dose to the skin of the wearer as well as dose from more penetrating radiation. Dose readings obtained from the present dosimeter can be used to estimate dose to a thin layer of skin through use of substantially thicker dosimeter phosphors. This is achieved by registering dose resulting from radiation passing through windows of substantially different density thickness to produce differences in dose readings that are significant in comparison with the expected deviation of individual phosphor readings from the average. The development also provides a method of fabricating a dosimeter holder with thin tough windows of uniform thickness at corresponding locations among dosimeters to permit consistency of dose readings.

It also will be clear that, although the present invention is described in terms of specific embodiments, various changes to the materials, equipment and process steps can be made by those skilled in the art within the scope of the following claims.

The embodiments of the invention in which an exclusive property or privilege is claimed are defined as follows:

1. A method of forming personnel dosimeter holders having a plurality of windows communicating with a plurality of corresponding compartments for TLD phosphors within the front face thereof to provide uniform window thickness in corresponding windows of different holders comprising:
   forming a die insert having at least one opening for receiving a window of plastic material;
   affixing at least one window of plastic material within said die insert; and
   positioning said die insert and window within a die shaped for injection molding of said dosimeter holder and injecting a thermoplastic material into said die around said die insert for forming said dosimeter holder with said insert embedded in the material of the holder and each of said compartments molded therein having a window therein at the front face of the holder.

2. The method of claim 1 wherein said die insert includes positioning tabs for contacting the internal walls of said die for positioning said die insert prior to injection molding.

3. The method of claim 1 wherein at least one of said windows is of aluminized polyethylene terephthalate of about 10 mg/cm$^2$ or less density thickness.

4. The method of claim 1 wherein said thermoplastic material is selected from the group consisting of acrylonitrile-butadiene-styrene, polypropylene and polycarbonate resins.

5. The method of claim 1 wherein said at least one window is of a plastic material selected from the group consisting of polyethylene terephthalate and polycarbonate resins.

6. The method of claim 1 wherein said thermoplastic material injected into said die around said die insert is filled with a neutron-absorbing material selected from the group consisting of BN, B$_4$C, LiF and Li$_2$BO$_4$.

7. The method of claim 1 wherein said at least one opening of said die insert includes inwardly extending portions from the internal circumference of said opening and said at least one window of plastic material is placed on said inwardly extending portion for support prior to injecting thermoplastic material into said die around said die insert.

8. The method of claim 1 wherein said die insert is formed with two openings each for receiving a window of plastic material, a window of 5–10 mg/cm$^2$ density thickness is affixed within a first opening and a window of 30–100 mg/cm$^2$ is affixed within a second opening.

9. The method of claim 1 wherein subsequent to injecting thermoplastic material into said die to form said dosimeter holder, TLD phosphors are inserted into the compartments of said holder and said phosphors within the holder are annealed at a temperature of 80°–100° C.

10. The method of claim 1 wherein only one window is included in the opening of said die insert and wherein each of the remaining of said plurality of windows in said holder is of at least 50 mg/cm$^2$ and is formed by injection molding of the thermoplastic material into said die.

* * * * *